United States Patent
Kim et al.

(10) Patent No.: US 11,302,483 B2
(45) Date of Patent: Apr. 12, 2022

(54) ELECTRONIC COMPONENT

(71) Applicant: SAMSUNG ELECTRO-MECHANICS CO., LTD., Suwon-si (KR)

(72) Inventors: Je Jung Kim, Suwon-si (KR); Su Kyoung Cha, Suwon-si (KR); Ji Won Lee, Suwon-si (KR); Seung Ryeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 56 days.

(21) Appl. No.: 16/854,248

(22) Filed: Apr. 21, 2020

(65) Prior Publication Data

US 2021/0183580 A1  Jun. 17, 2021

(30) Foreign Application Priority Data

Dec. 13, 2019  (KR) .......................... 10-2019-0167025

(51) Int. Cl.
| | |
|---|---|
| *H01G 4/30* | (2006.01) |
| *H01G 2/06* | (2006.01) |
| *H01G 4/12* | (2006.01) |
| *H01G 4/012* | (2006.01) |

(52) U.S. Cl.
CPC .............. *H01G 4/30* (2013.01); *H01G 2/065* (2013.01); *H01G 4/012* (2013.01); *H01G 4/1218* (2013.01)

(58) Field of Classification Search
CPC .......... H01G 4/224; H01G 4/248; H01G 4/30; H01G 4/38; H01G 4/012; H01G 4/1227; H01G 4/1245; H01G 4/065; H01G 4/0085; H01G 4/40; H01G 4/12; H01G 4/1218; H05K 1/0231
See application file for complete search history.

(56) References Cited

U.S. PATENT DOCUMENTS

| | | | |
|---|---|---|---|
| 2010/0243307 A1* | 9/2010 | McConnell | ............ H01G 2/065 174/260 |
| 2015/0022937 A1* | 1/2015 | Park | ..................... H05K 3/3431 361/270 |

(Continued)

FOREIGN PATENT DOCUMENTS

| | | |
|---|---|---|
| KR | 10-2014-0038876 A | 3/2014 |
| KR | 10-2015-0010181 A | 1/2015 |

*Primary Examiner* — Michael P McFadden
(74) *Attorney, Agent, or Firm* — Morgan, Lewis & Bockius LLP

(57) ABSTRACT

An electronic component includes a capacitor body having first to sixth surfaces, and including a plurality of dielectric layers and first and second internal electrodes; first and second external electrodes disposed on both ends of the capacitor body in a second direction in which the third and fourth surfaces oppose each other, respectively; a third external electrode disposed on the first surface of the capacitor body; and first to third metal frames connected to the first to third external electrodes, respectively, both ends of the first internal electrode are exposed through the third and fourth surfaces of the capacitor body, respectively, and the second internal electrode includes a lead portion exposed through the first surface of the capacitor body and connected to the third external electrode.

20 Claims, 9 Drawing Sheets

(56) References Cited

U.S. PATENT DOCUMENTS

| 2015/0116892 | A1* | 4/2015 | Park | H01G 2/06 |
|---|---|---|---|---|
| | | | | 361/275.3 |
| 2018/0158614 | A1* | 6/2018 | Park | H01G 4/30 |
| 2018/0350521 | A1* | 12/2018 | Oh | H01G 4/30 |
| 2019/0180943 | A1* | 6/2019 | Togawa | H01L 41/053 |

* cited by examiner

I-I'

ELECTRONIC COMPONENT

CROSS-REFERENCE TO RELATED APPLICATION(S)

This application claims benefit of priority to Korean Patent Application No. 10-2019-0167025 filed on Dec. 13, 2019 in the Korean Intellectual Property Office, the disclosure of which is incorporated herein by reference in its entirety.

TECHNICAL FIELD

The present disclosure relates to an electronic component.

BACKGROUND

A multilayer capacitor ceramic capacitor (MLCC) has a small size and high capacitance and may be easily mounted.

With the development of eco-friendly vehicles and electrical vehicles, a power driving system has increasingly been used in vehicles, and consumption of multilayer capacitors used for such vehicles has increased.

To use an electronic component in a vehicle, reliability or electrical reliability against high levels of heat may be necessary. Accordingly, an MLCC has been required to have high performance.

Also, as component mounting density has increased, there has been demand for a product having increased mounting density in a limited space, implementing high capacitance, and having durability against vibrations and deformation.

SUMMARY

An aspect of the present disclosure is to provide a multilayer ceramic capacitor having increased reliability and an electronic component having reduced ESR.

According to an aspect of the present disclosure, an electronic component includes a capacitor body having first and second surfaces opposing each other, third and fourth surfaces connected to the first and second surfaces and opposing each other, fifth and sixth surfaces connected to the first and second surfaces and to the third and fourth surfaces and opposing each other, and including a plurality of dielectric layers layered in a first direction in which the fifth and sixth surfaces oppose each other and first and second internal electrodes alternately layered with the dielectric layer interposed therebetween; first and second external electrodes disposed on both ends of the capacitor body in a second direction in which the third and fourth surfaces oppose each other, respectively; a third external electrode disposed on the first surface of the capacitor body; and first to third metal frames connected to the first to third external electrodes, respectively, both ends of the first internal electrode are exposed through the third and fourth surfaces of the capacitor body, respectively, and the second internal electrode includes a 2-1st lead portion exposed through the first surface of the capacitor body and connected to the third external electrode.

The first metal frame may include a first vertical portion bonded to the first external electrode and extending further than one end of the capacitor body in a third direction in which the first and second surfaces oppose each other, and a first mounting portion extending from one end of the first vertical portion in the second direction, the second metal frame may include a second vertical portion bonded to the second external electrode and extending further than the one end of the capacitor body in the third direction, and a second mounting portion extending from one end of the second vertical portion in the second direction, and the third metal frame may include a third vertical portion bonded to the third external electrode and extending further than the one end of the capacitor body in the third direction from the third vertical portion, and a third mounting portion extending from one end of the third vertical portion in the first direction.

The third metal frame may include a 3-1st metal frame and a 3-2nd metal frame connected to the third external electrode and spaced apart from each other in the first direction, the 3-1st metal frame includes a 3-1st horizontal portion bonded to the third external electrode, a 3-1st vertical portion extending further than one end of the capacitor body in the third direction from the 3-1st horizontal portion, and a 3-1st mounting portion extending from one end of the 3-1st vertical portion in the first direction, and the 3-2nd metal frame may include a 3-2nd horizontal portion bonded to the third external electrode, a 3-2nd vertical portion extending further than the one end of the capacitor body in the third direction from the 3-2nd horizontal portion, and a 3-2nd mounting portion extending from one end of the 3-2nd vertical portion in the first direction.

The first external electrode may include a first connection portion disposed on the third surface of the capacitor body and a first band portion extending from the first connection portion to a portion of each of the first, second, fifth, and sixth surfaces of the capacitor body, and the second external electrode may include a second connection portion disposed on the fourth surface of the capacitor body and a second band portion extending from the second connection portion to a portion of each of the first, second, fifth, and sixth surfaces of the capacitor body.

The third external electrode may extend to a portion of each of the fifth and sixth surfaces of the capacitor body.

The second internal electrode may further include a 2-2nd lead portion exposed through the second surface of the capacitor body, and the electronic component may further include a fourth external electrode disposed on the second surface of the capacitor body and connected to the 2-2nd lead portion.

The fourth external electrode may extend to a portion of each of the fifth and sixth surfaces of the capacitor body.

According to an aspect of the present disclosure, an electronic component includes a capacitor body having first and second surfaces opposing each other, third and fourth surfaces connected to the first and second surfaces and opposing each other, fifth and sixth surfaces connected to the first and second surfaces and to the third and fourth surfaces and opposing each other, and including a plurality of dielectric layers layered in a first direction in which the fifth and sixth surfaces oppose each other and third and fourth internal electrodes alternately layered with the dielectric layer interposed therebetween; first and second external electrodes disposed on both ends of the capacitor body in a second direction in which the third and fourth surfaces oppose each other, respectively; a fifth external electrode disposed on the first surface of the capacitor body; a plurality of sixth external electrodes disposed on the first surface of the capacitor body and spaced apart from the fifth external electrode; first and second metal frames connected to the first and second external electrodes, respectively; a fifth metal frame connected to the fifth external electrode; and a plurality of sixth metal frames connected to the plurality of sixth external electrodes, respectively, both ends of the third internal electrode are exposed through the third and fourth surfaces of the capacitor body, respectively, and the third internal electrode includes a 3-1st lead portion exposed through the first surface of the capacitor body and connected to the fifth external electrode, and the fourth internal electrode includes a plurality of 4-1st lead portions exposed through the first surface of the capacitor body, connected to the plurality of sixth external electrodes, respectively, and spaced apart from each other.

The first metal frame may include a first vertical portion bonded to the first external electrode and extending further than one end of the capacitor body in a third direction in which the first and second surfaces oppose each other, and a first mounting portion extending from one end of the first vertical portion in the second direction, the second metal frame may include a second vertical portion bonded to the second external electrode and extending further than the one end of the capacitor body in the third direction, and a second mounting portion extending from one end of the second vertical portion in the second direction, the fifth metal frame may include a fifth horizontal portion bonded to the fifth external electrode, a fifth vertical portion extending further than the one end of the capacitor body in the third direction from the fifth horizontal portion, and a fifth mounting portion extending from one end of the fifth vertical portion in the first direction, and the plurality of sixth metal frames may include a sixth horizontal portion bonded to the sixth external electrode, a sixth vertical portion extending further than the one end of the capacitor body in the third direction from the sixth horizontal portion, and a sixth mounting portion extending from one end of the sixth vertical portion in the first direction.

The fifth metal frame may include a 5-1st metal frame and a 5-2nd metal frame connected to the fifth external electrode and spaced apart from each other in the first direction, the 5-1st metal frame includes a 5-1st horizontal portion bonded to the fifth external electrode, a 5-1st vertical portion extending further than one end of the capacitor body in the third direction from the 5-1st horizontal portion, and a 5-1st mounting portion extending from one end of the 5-1st vertical portion in the first direction, and the 5-2nd metal frame may include a 5-2nd horizontal portion bonded to the fifth external electrode, a 5-2nd vertical portion extending further than the one end of the capacitor body in the third direction from the 5-2nd horizontal portion, and a 5-2nd mounting portion extending from one end of the 5-2nd vertical portion in the first direction.

The first external electrode may include a first connection portion disposed on the third surface of the capacitor body and a first band portion extending from the first connection portion to a portion of each of the first, second, fifth, and sixth surfaces of the capacitor body, and the second external electrode may include a second connection portion disposed on the fourth surface of the capacitor body and a second band portion extending from the second connection portion to a portion of each of the first, second, fifth, and sixth surfaces of the capacitor body.

The fifth and sixth external electrodes may extend to portions of each of the fifth and sixth surfaces of the capacitor body.

The third internal electrode may further include a 3-2nd lead portion exposed through the second surface of the capacitor body, the fourth internal electrode further includes a plurality of 4-2nd lead portions exposed through the second surface of the capacitor body and spaced apart from each other, and the electronic component may further include a seventh external electrode disposed on the second surface of the capacitor body and connected to the 3-2nd lead portion, and a plurality of eighth external electrodes disposed on the second surface of the capacitor body and spaced apart from the seventh external electrode and connected to the plurality of 4-2nd lead portions, respectively.

The seventh and eighth external electrodes may extend to a portion of each of the fifth and sixth surfaces of the capacitor body.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
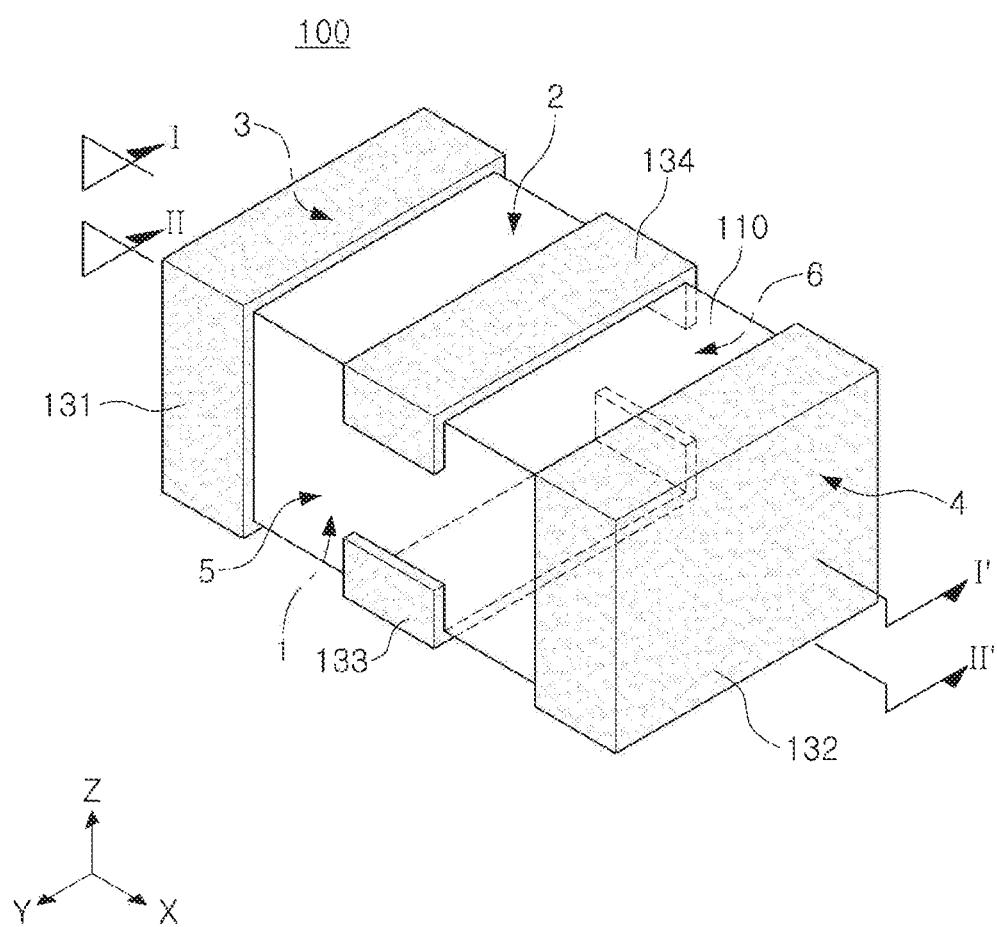
FIG. 1 is a perspective diagram illustrating a multilayer capacitor applied to an electronic component according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Accordingly, shapes and sizes of elements in the drawings may be exaggerated for clarity of description, and elements indicated by the same reference numeral are same elements in the drawings.

In the drawings, an X direction, a Y direction, and a Z direction may indicate a length direction, a width direction, and a thickness direction of an electronic component, respectively.

The width direction may be the same as a layering direction in which dielectric layers are layered.

Figure 2:
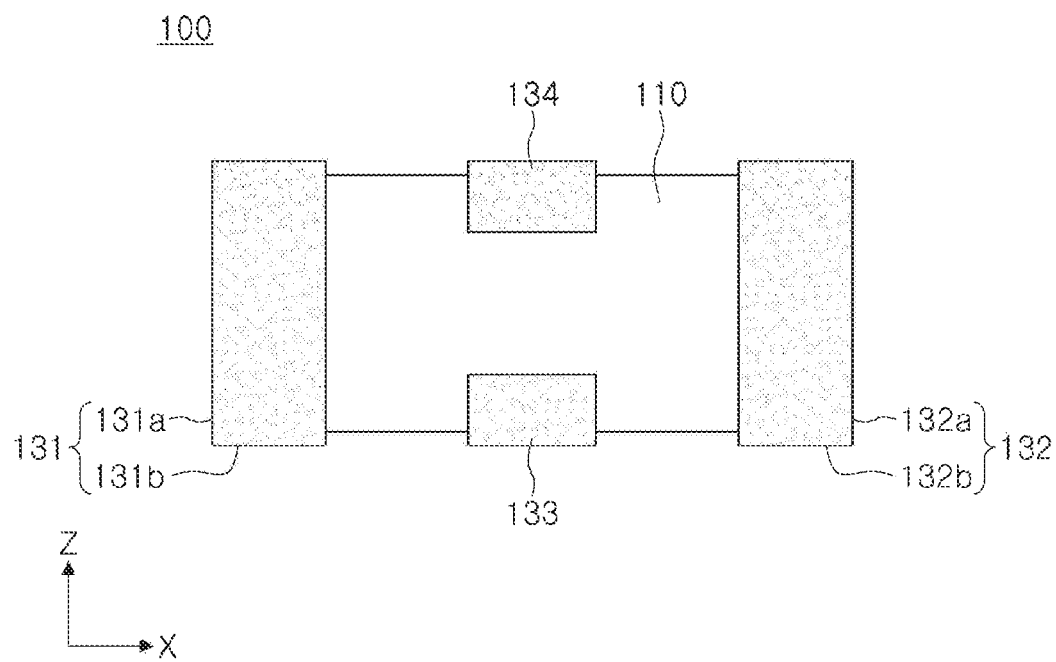
FIG. 2 is a diagram illustrating the multilayer capacitor illustrated in FIG. 1, viewed from the front.
Figure 3:
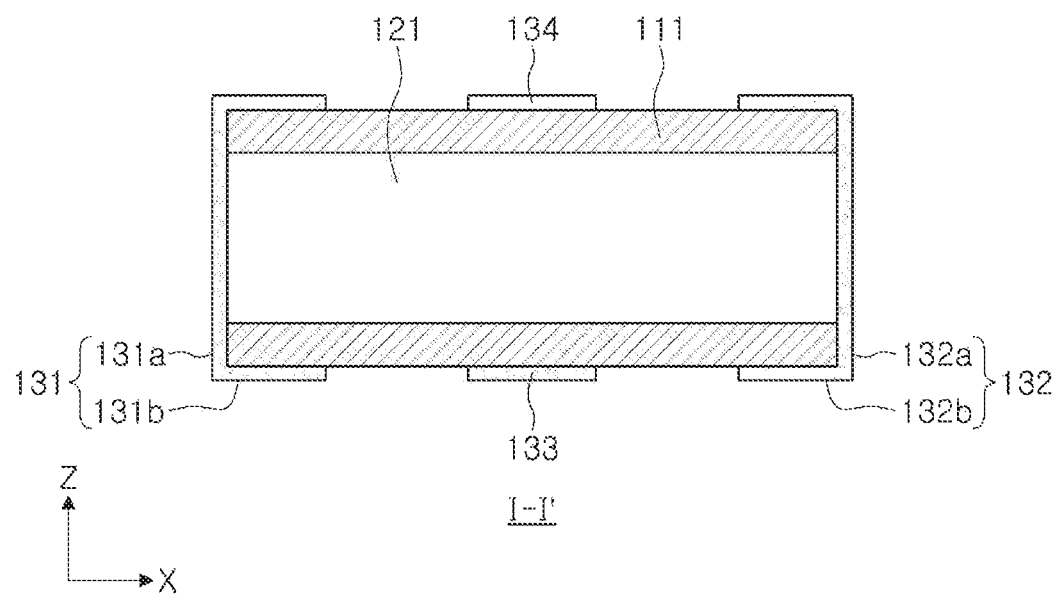
FIG. 3 is a cross-sectional diagram taken along line I-I' in FIG. 1.
Figure 4:
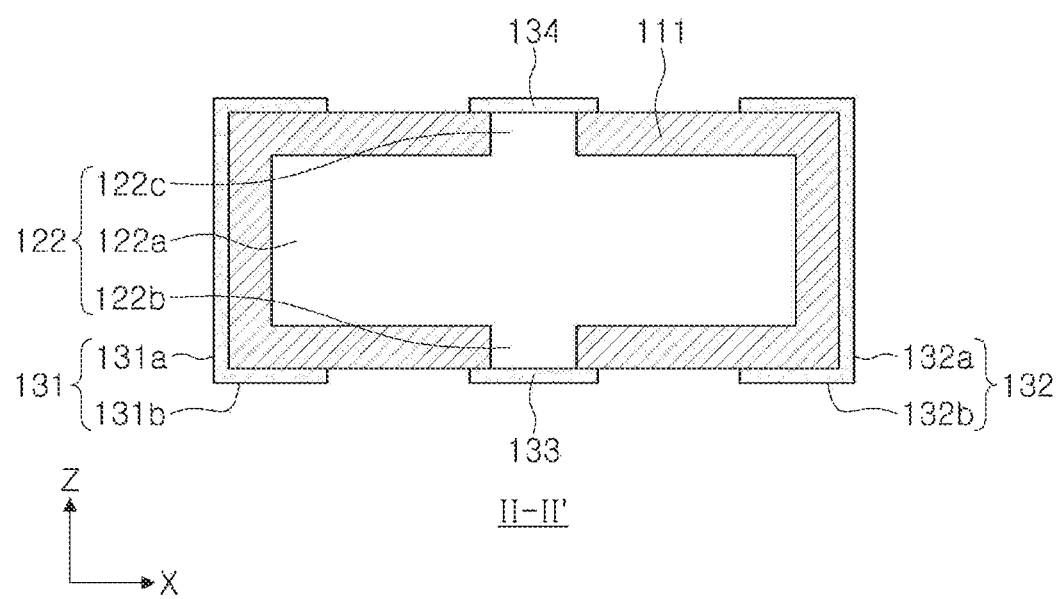
FIG. 4 is a cross-sectional diagram taken along line II-II' in FIG. 1.
Figure 5:
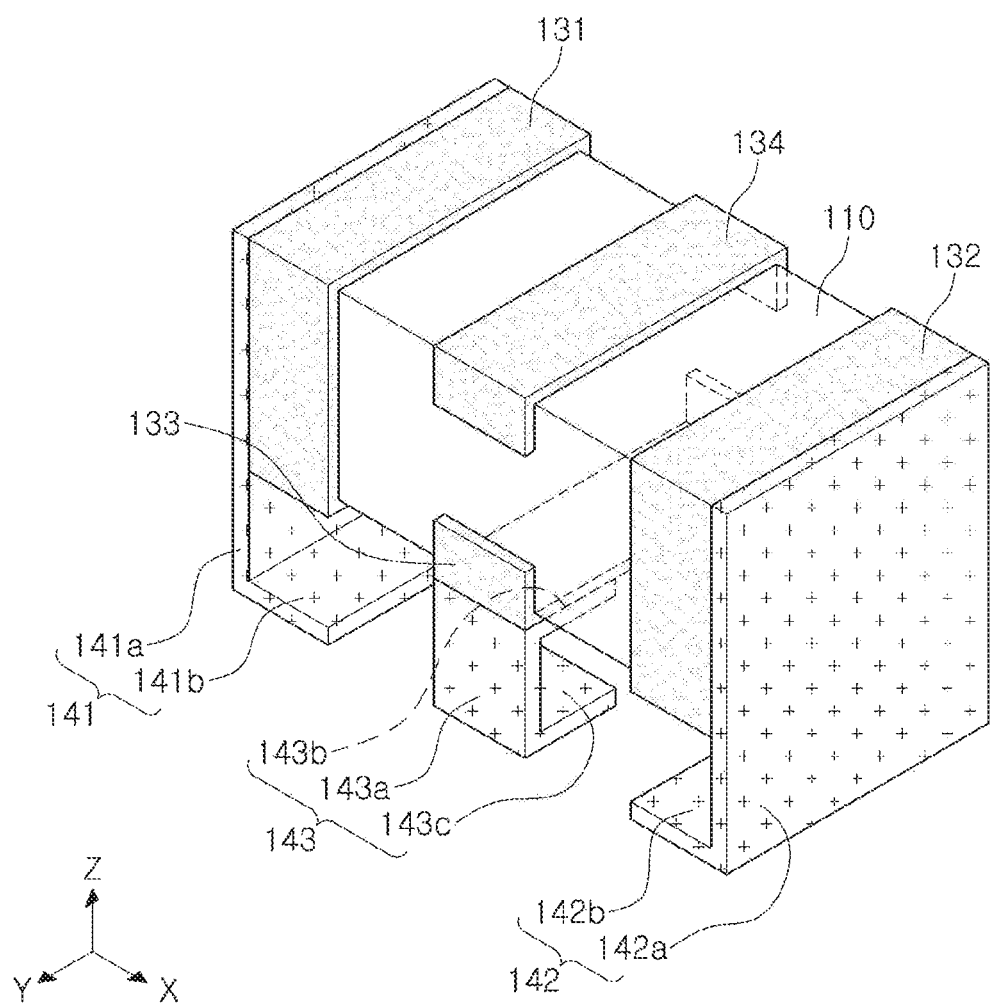
FIG. 5 is a perspective diagram illustrating an electronic component according to an example embodiment of the present disclosure.
Figure 6:
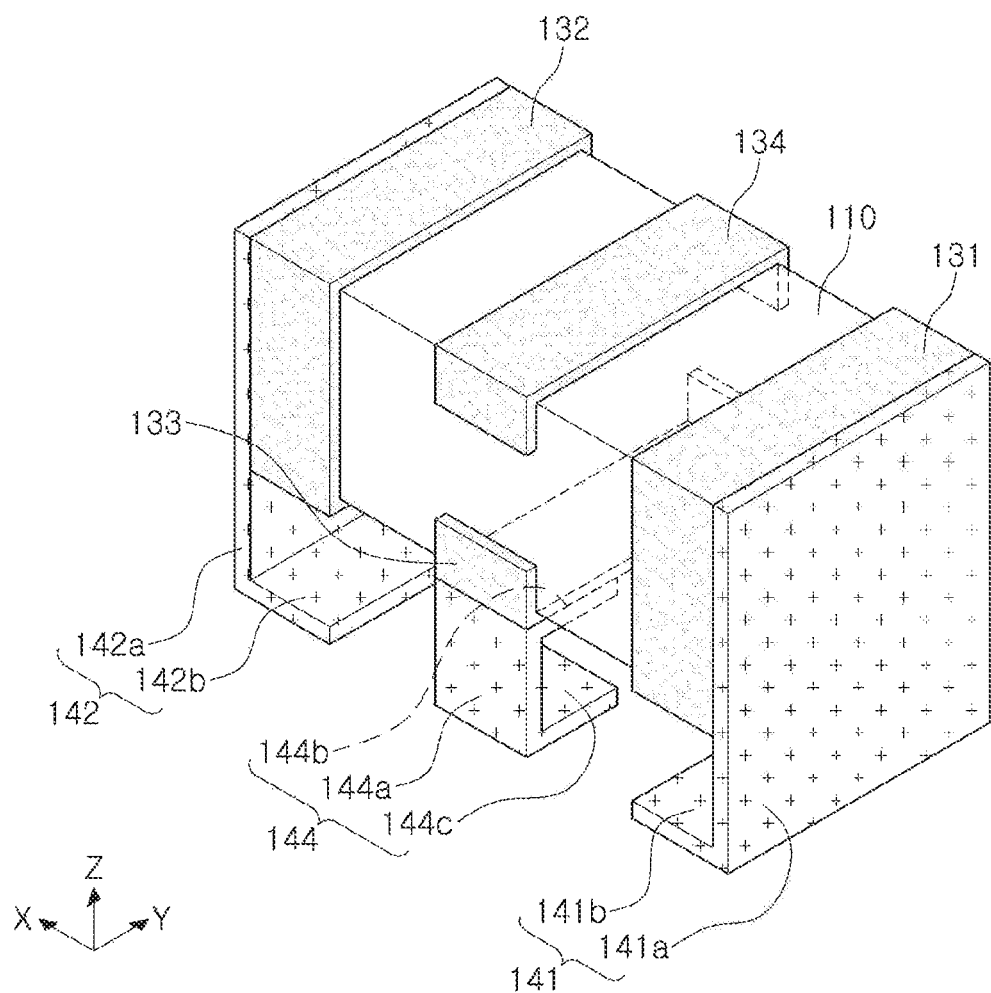
FIG. 6 is a perspective diagram illustrating the electronic component illustrated in FIG. 5, rotated by 180° degrees in a Y direction.

FIG. 1 is a perspective diagram illustrating a multilayer capacitor applied to an electronic component according to an example embodiment. FIG. 2 is a diagram illustrating the multilayer capacitor illustrated in FIG. 1, viewed from the front. FIG. 3 is a cross-sectional diagram taken along line I-I' in FIG. 1. FIG. 4 is a cross-sectional diagram taken along line II-II' in FIG. 1. FIG. 5 is a perspective diagram illustrating an electronic component according to an example embodiment. FIG. 6 is a perspective diagram illustrating the electronic component illustrated in FIG. 5, rotated by 180° degrees in a Y direction.

Referring to FIGS. 1 to 6, a multilayer capacitor 100 in the example embodiment may include a capacitor body 110, first to third external electrodes 131 to 133, and first to third metal frames 141 to 143.

The capacitor body 110 may include a plurality of dielectric layers 111 layered in the Y direction, and a plurality of internal electrodes 121 and 122 alternately disposed in the Y direction with the dielectric layer 111 interposed therebetween.

The capacitor body 110 may have a hexahedral shape, and may include first and second surfaces 1 and 2 opposing each other in the Z direction, third and fourth surfaces 3 and 4 connected to the first and second surfaces 1 and 2 and opposing each other in the X direction, and fifth and sixth surfaces 5 and 6 connected to the first and second surfaces 1 and 2 and the third and fourth surfaces 3 and 4 and opposing each other in the Y direction.

The dielectric layers 111 are in a sintered state, and a boundary between adjacent dielectric layers 111 may be integrated such that it may be difficult to identify the boundary without using a scanning electron microscope (SEM).

The dielectric layer 111 may include a ceramic material having a high dielectric constant. For example, the first and second dielectric layers 111 and 112 may include barium titanate ($BaTiO_3$) based powder or strontium titanate ($SrTiO_3$) based ceramic powder.

The dielectric layers 111 may further include one or more of ceramic additives, organic solvents, plasticizers, coupling agents, dispersing agents, and the like, in addition to the ceramic powder.

The capacitor body 110 may include cover regions disposed on both sides of the capacitor body 110 in the Y direction as margins.

The cover regions may have a material and a configuration the same as those of the dielectric layer 111 other than the configuration in which the cover regions do not include an internal electrode.

The cover region may be formed by disposing a single dielectric layer or layering two or more dielectric layers on both outermost regions of the capacitor body 110 in the Y direction, and may prevent damages to the first and second internal electrodes 121 and 122 caused by physical or chemical stress.

The first external electrode 131 may be disposed on one end of the capacitor body 110 in the X direction.

The first external electrode 131 may include a first connection portion 131a disposed on the third surface 3 of the capacitor body 110, and a first band portion 131b extending from the first connection portion 131a to a portion of each of the first, second, fifth, and sixth surfaces 1, 2, 5, and 6 of the capacitor body 110.

The first band portion 131b may improve cohesion strength of the first external electrode 131.

The second external electrode 132 may be disposed on the other end of the capacitor body 110 in the X direction.

The second external electrode 132 may include a second connection portion 132a disposed on the fourth surface 4 of the capacitor body 110, and a second band portion 132b extending from the second connection portion 132a to a portion of each of the first, second, fifth, and sixth surfaces 1, 2, 5, and 6 of the capacitor body 110.

The second band portion 132b may improve cohesion strength of the second external electrode 132.

The third external electrode 133 may be disposed on the first surface 1 of the capacitor body 110 and may be spaced apart from the first and second band portions 131b and 132b of the first and second external electrodes 131 and 132 in the X direction.

The third external electrode 133 may extend to a portion of each of the fifth and sixth surfaces 5 and 6 of the capacitor body 110 and may improve cohesion strength.

The first to third external electrodes 131 to 133 may further include a plating layer (not illustrated) disposed on each surface of the first to third external electrodes 131 to 133.

In a general multilayer capacitor, an external electrode may be disposed on each of both ends of the capacitor body 110 opposing in the X direction. Accordingly, when an alternating current is applied to the external electrode, a path of the current may be relatively long such that a great current loop may be formed, which may increase a size of an induced magnetic field and may increase inductance of an electronic component.

In the example embodiment, the third external electrode 133 may be disposed between the first external electrode 131 and the second external electrode 132 on the first surface 1 of the capacitor body 110 to reduce a path of current. Accordingly, a current loop may be reduced such that inductance of the multilayer capacitor 100 may decrease.

The first metal frame 141 may be connected to the first external electrode 131.

The first metal frame 141 may include a first vertical portion 141a and a first mounting portion 141b.

The first vertical portion 141a may be bonded to the first connection portion 131a of the first external electrode 131, and may extend downwardly further than a lower end of the capacitor body 110 in the Z direction such that the capacitor body 110 may be spaced apart from a board by a certain gap when the multilayer capacitor is mounted on the board.

A conductive adhesive (not illustrated) may be provided between the first vertical portion 141a and the first connection portion 131a of the first external electrode 131.

The first mounting portion 141b may extend from one end of the first vertical portion 141a in the X direction.

The first mounting portion 141b may extend from one end of the first vertical portion 141a to the fourth surface 4 of the capacitor body 110 in the X direction to reduce an overall size of the electrical component.

The first mounting portion 141b may work as a terminal when the multilayer capacitor is mounted on a board, and may be bonded to a land pattern of the board by solder, or the like, and may be electrically connected.

The second metal frame 142 may be connected to the second external electrode 132.

The second metal frame 142 may include a second vertical portion 142a and a second mounting portion 142b.

The second vertical portion 142a may be bonded to the second connection portion 132a of the second external electrode 132, and may extend downwardly further than a lower end of the capacitor body 110 in the Z direction such that the capacitor body 110 may be spaced apart from a board by a certain gap when the multilayer capacitor is mounted on the board.

A conductive adhesive may be provided between the second vertical portion 142a and the second external electrode 132.

The second mounting portion 142b may extend from one end of the second vertical portion 142a in the X direction.

The second mounting portion 142b may extend from one end of the second vertical portion 142a to the third surface 3 of the capacitor body 110 to reduce an overall size of the electronic component.

The second mounting portion 142b may work as a terminal when the multilayer capacitor is mounted on a board, and may be bonded to a land pattern of the board by solder, or the like, and may be electrically connected.

The third metal frame may be connected to the third external electrode, and may include a third horizontal portion, a third vertical portion, and a third mounting portion.

The third horizontal portion may be bonded to the third external electrode, and a conductive adhesive may be provided between the third horizontal portion and the third external electrode.

The third vertical portion may be a portion extending from the third horizontal portion in the Z direction, and may extend downwardly further than a lower end of the capacitor body in the Z direction such that the capacitor body may be spaced apart from a board by a certain gap when the multilayer capacitor is mounted on the board.

The third mounting portion may extend from one end of the third vertical portion in the Y direction.

The third mounting portion may work as a terminal when the multilayer capacitor is mounted on a board, and may be bonded to a land pattern of the board by solder, or the like, and may be electrically connected.

In the example embodiment, the third metal frame may include a 3-1st metal frame 143 and a 3-2nd metal frame 144 connected to the third external electrode 133 and spaced apart from each other in the Y direction.

The 3-1st metal frame 143 may include a 3-1st horizontal portion 143b, a 3-1st vertical portion 143a, and a 3-1st mounting portion 143c.

The 3-1st horizontal portion 143b may be bonded to the third external electrode 133.

The 3-1st vertical portion 143a may be a portion extending further than a lower end of the capacitor body 110 from the 3-1st horizontal portion 143b in the Z direction.

The 3-1st mounting portion 143c may be a portion extending from one end of the 3-1st vertical portion 143a in the Y direction.

The 3-2nd metal frame 144 may include a 3-2nd horizontal portion 144b, a 3-2nd vertical portion 144a, and a 3-2nd mounting portion 144c.

The 3-2nd horizontal portion 144b may be bonded to the third external electrode 133.

The 3-2nd vertical portion 144a may be a portion extending further than a lower end of the capacitor body 110 from the 3-2nd horizontal portion 144b in the Z direction.

The 3-2nd mounting portion 144c may be a portion extending from one end of the 3-2nd vertical portion 144a in the Y direction.

When the third metal frame is configured to be divided into the 3-1st and the 3-2nd metal frames 143 and 144, a gap between electrodes may be reduced such that ESR may be reduced.

Also, a portion bonded to the board may be expanded to the 3-1st mounting portion 143c of the 3-1st metal frame 143 and the 3-2nd mounting portion 144c of the 3-2nd metal frame 144 such that cohesion force with a board may further improve when the multilayer capacitor is mounted on the board.

The first and second internal electrodes 121 and 122 may be provided with different polarities.

The first and second internal electrodes 121 and 122 may be electrically insulated with each other by the dielectric layer 111 interposed therebetween.

A material of the first and second internal electrodes 121 and 122 is not limited to any particular material, and may be formed using a conductive paste including one or more of noble materials such as platinum (Pt), palladium (Pd), palladium-silver (Pd—Ag) alloy, and the like, nickel (Ni), and copper (Cu).

As a method of printing the conductive paste, a screen printing method or a gravure printing method may be used, but an example of the method is not limited thereto.

Both ends of the first internal electrode 121 may be exposed through the third and fourth surfaces 3 and 4 of the capacitor body 110, respectively, and may be connected to the first and second connection portions 131a and 132a of the first and second external electrodes 131 and 132, respectively.

The second internal electrode 122 may include a second capacitance portion 122a, and a 2-1st lead portion 122b extending from the second capacitance portion 122a, exposed through the first surface 1 of the capacitor body 110, and connected to the third external electrode 133.

The second capacitance portion 122a may overlap the first internal electrode 121 and may contribute to forming capacitance.

The second internal electrode 122 may further include a 2-2nd lead portion 122c extending from the second capacitance portion 122a and exposed through the second surface 2 of the of the capacitor body 110.

A fourth external electrode 134 may be disposed on the second surface 2 of the capacitor body 110 and may be connected to the 2-2nd lead portion 122c.

The fourth external electrode 134 may extend to a portion of each of the fifth and sixth surfaces 5 and 6 of the capacitor body 110 and may improve cohesion force.

In a general multilayer capacitor, when the multilayer capacitor is mounted on a board, a capacitor body may be directly in contact with the board by solder, and heat generated from the board or mechanical deformation of the board may be directly transmitted to the multilayer capacitor such that it may be difficult to secure a high level of reliability.

Recently, a metal frame may be attached to a side surface of the multilayer capacitor to secure a gap between the multilayer capacitor and the board on which the multilayer capacitor is mounted. Accordingly, stress from the board may not be directly transmitted to the multilayer capacitor.

However, in this case, a gap may be formed between the multilayer capacitor and the board due to the bonded metal frame, which may increase ESR of the multilayer capacitor as compared to a structure in which a multilayer capacitor is directly in contact with a board.

In the example embodiment, the mounting portion of the metal frame may be disposed on each of both ends of the capacitor body and in a central portion such that a gap between electrodes may be reduced, and also, even though the metal frame is included, ESR of the multilayer capacitor may be reduced.

Figure 7:
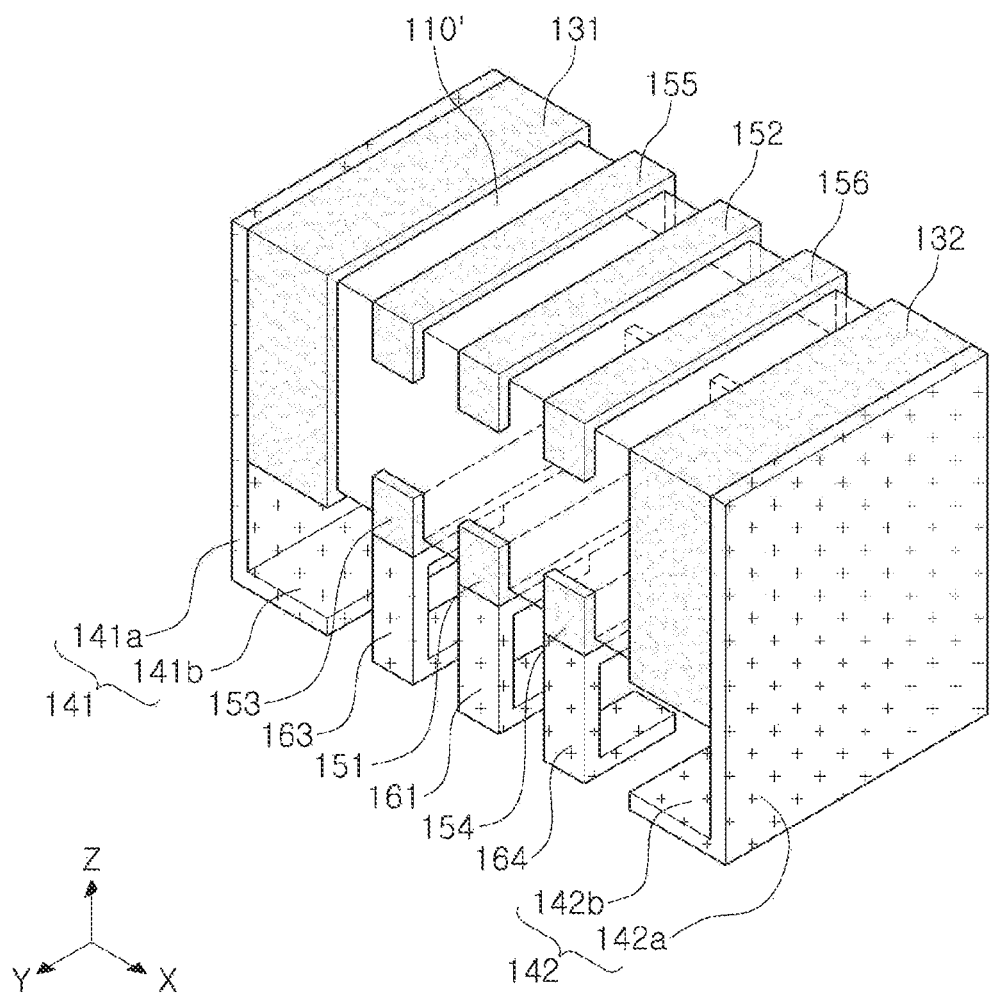
FIG. 7 is a perspective diagram illustrating an electronic component according to another example embodiment of the present disclosure.
Figure 8:
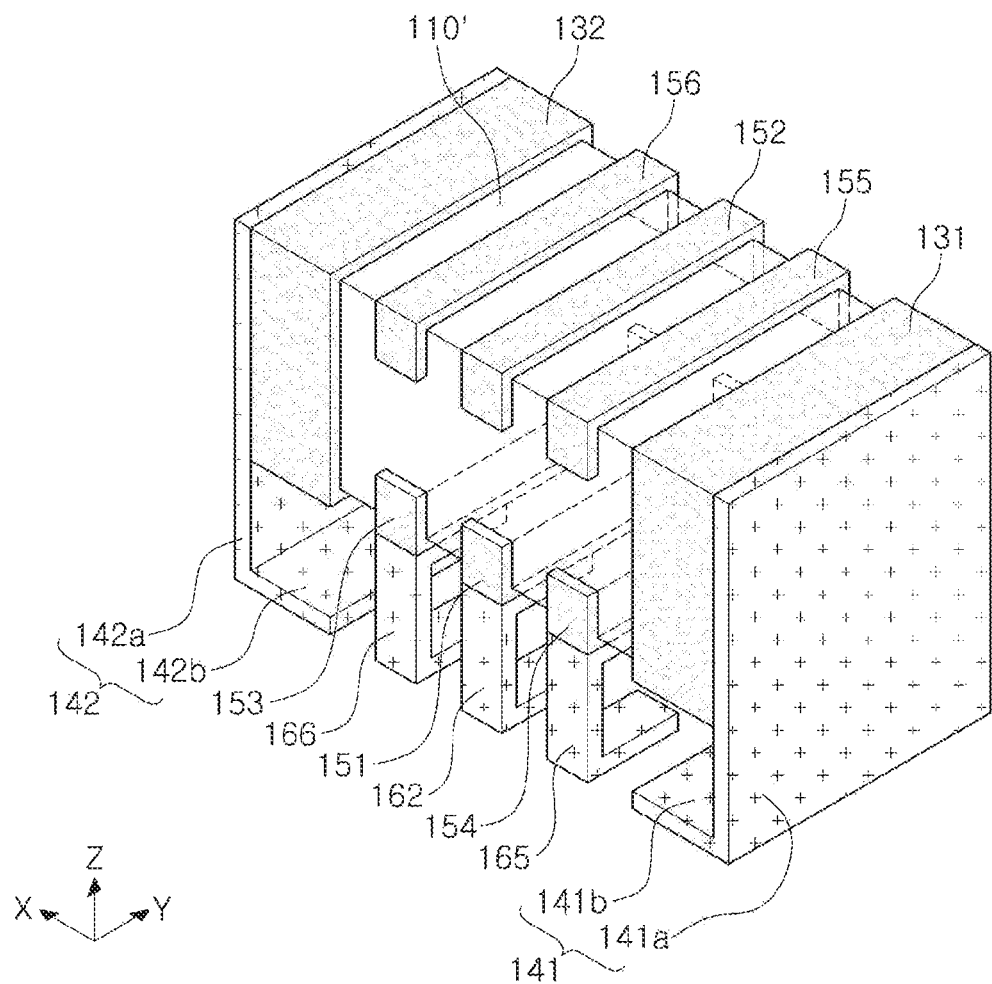
FIG. 8 is a perspective diagram illustrating the electronic component illustrated in FIG. 7, rotated by 180° degrees in a Y direction.
Figure 9A:
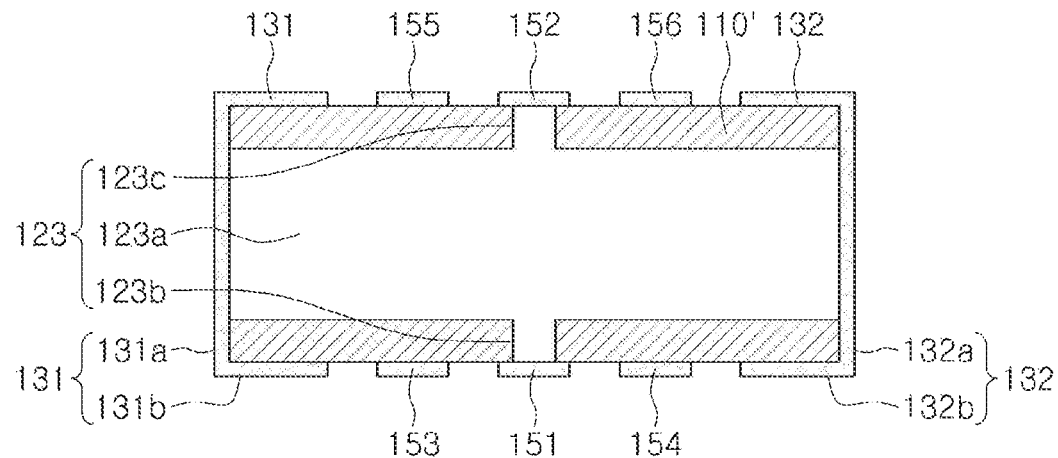
FIGS. 9A and 9B are cross-sectional diagrams illustrating structures of third and fourth internal electrodes applied to the electronic component illustrated in FIG. 7, respectively.
Figure 9B:
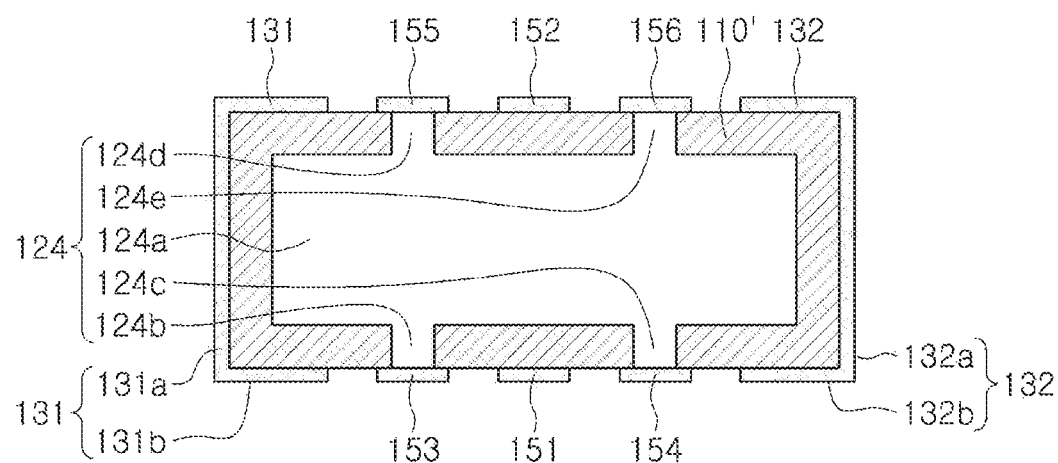

FIG. 7 is a perspective diagram illustrating an electronic component according to another example embodiment. FIG. 8 is a perspective diagram illustrating the electronic component illustrated in FIG. 7, rotated by 180° degrees in a Y direction. FIGS. 9A and 9B are cross-sectional diagrams illustrating structures of third and fourth internal electrodes applied to the electronic component illustrated in FIG. 7, respectively.

The descriptions of the same element described in the aforementioned example embodiment will not be provided, and different elements will mainly be described in detail.

Referring to FIGS. 7 to 9B, an electronic component in the example embodiment may include a capacitor body 110' including third and fourth internal electrodes 123 and 124 alternately layered with the dielectric layer interposed therebetween; first and second external electrodes 131 and 132 disposed on both ends of the capacitor body 110' in the X direction, respectively, a fifth external electrode 151 disposed on a first surface 1 of the capacitor body 110', a plurality of sixth external electrodes 153 and 154 disposed on the first surface 1 of the capacitor body 110' and spaced apart from the fifth external electrode 151, first and second metal frames 141 and 142 connected to the first and second external electrodes 131 and 132, respectively, a fifth metal frame 162 connected to the fifth external electrode 151, and a plurality of sixth metal frames 165 and 166 connected to the plurality of sixth external electrodes 153 and 154, respectively.

The fifth external electrode 151 and the sixth external electrodes 153 and 154 may extend to a portion of each of the fifth and sixth surfaces 5 and 6 of the capacitor body 110' to increase cohesion force.

The first external electrode 131, the second external electrode 132, the fifth external electrode 151, and the sixth external electrodes 153 and 154 may be disposed in a dual layer structure including an internal layer and an external layer such that the components may easily be applied as component used for vehicles.

The internal layer may be formed of Cu, and the external layer may be formed of a conductive epoxy.

The third internal electrode 123 may include a third capacitance portion 123a, and a 3-1st lead portion 123b extending to be exposed through the first surface 1 of the capacitor body 110'.

The 3-1st lead portion 123b may be exposed through the first surface 1 of the capacitor body 110' and may be connected to the fifth external electrode 151.

The fourth internal electrode 124 may include a fourth capacitance portion 124a overlapping the third capacitance portion 123a in the Y direction, and may include a plurality of 4-1st lead portions 124b and 124c exposed from the fourth capacitance portion 124a through the first surface 1 of the capacitor body 110', spaced apart from each other in the X direction, and connected to the plurality of 4-1st lead portions 124b and 124c connected to the plurality of sixth external electrodes 153 and 154, respectively.

The first metal frame 141 may include a first vertical portion 141a bonded to the first external electrode 131 and extending further than one end of the capacitor body 110' in the Z direction, and a first mounting portion 141b extending from one end of the first vertical portion 141a in the X direction.

The second metal frame 142 may include a second vertical portion 142a extending further than one end of the capacitor body 110' in the Z direction, and a second mounting portion 142b extending from one end of the second vertical portion 142a in the X direction.

In the example embodiment, the fifth metal frame may include a fifth horizontal portion bonded to the fifth external electrode, a fifth vertical portion extending further than one end of the capacitor body in the Z direction from the fifth horizontal portion, and a fifth mounting portion extending from one end of the fifth vertical portion in the Y direction.

The fifth metal frame may include a 5-1st metal frame 161 and a 5-2nd metal frame 162 connected to the fifth external electrode 151 in the Y direction.

The 5-1st metal frame 161 may include a 5-1st horizontal portion bonded to the fifth external electrode 151, a 5-1st vertical portion extending further than one end of the capacitor body 110' in the Z direction from the 5-1st horizontal portion, and a 5-1st mounting portion extending from one end of the 5-1st vertical portion in the Y direction.

The 5-2nd metal frame 162 may include a 5-2nd horizontal portion bonded to the fifth external electrode 151, a 5-2nd vertical portion extending further than one end of the capacitor body 110' in the Z direction from the 5-2nd horizontal portion, and a 5-2nd mounting portion extending from one end of the 5-2nd vertical portion in the Y direction.

In the example embodiment, the plurality of sixth metal frames may include a sixth horizontal portion bonded to the sixth external electrode, a sixth vertical portion extending further than one end of the capacitor body in the Z direction from the sixth horizontal portion, and a sixth mounting portion extending from one end of the sixth vertical portion in the Y direction.

The plurality of sixth metal frames may include 6-1st metal frames 163 and 164 and 6-2nd metal frames 165 and 166 connected to the fifth external electrode 151 and spaced apart from each other in the Y direction.

The plurality of 6-1st metal frames 163 and 164 may be spaced apart from each other in the X direction, and the plurality of 6-2nd metal frames 165 and 166 may be spaced apart from each other in the X direction.

The other configurations of the sixth metal frame may be similar to the configurations of the fifth metal frame, and thus, the descriptions thereof will not be provided.

The third external electrode 123 may further include a 3-2 lead portion 123c exposed through the second surface 2 of the capacitor body 110', and the fourth internal electrode 124 may further include a plurality of 4-2nd lead portions 124d and 124e exposed through the second surface 2 of the capacitor body 110' and spaced apart from each other in the X direction.

A seventh external electrode 152 may be disposed on the second surface 2 of the capacitor body 110' and may be connected to the 3-2 lead portion 123c, and a plurality of eighth external electrodes 155 and 156 spaced apart from the seventh external electrode 152 in the X direction and connected to the plurality of 4-2nd lead portions 124d and 124e, respectively, may be disposed on the second surface 2 of the capacitor body 110'.

The seventh external electrode 152 and the eighth external electrodes 155 and 156 may extend to a portion of each of the fifth and sixth surfaces 5 and 6 of the capacitor body 110'.

In the example embodiment, the electronic component may include two fourth external electrodes and two sixth metal frames as illustrated in the diagrams, but an example embodiment thereof is not limited thereto. The number of each of the fourth external electrode and the sixth metal frame may be three or more.

In a general multilayer capacitor, when the multilayer capacitor is mounted on a board, a capacitor body may be directly in contact with the board by solder, and heat generated from the board or mechanical deformation of the board may be directly transmitted to the multilayer capacitor such that it may be difficult to secure a high level of reliability.

Recently, a metal frame may be attached to a side surface of the multilayer capacitor to secure a gap between the multilayer capacitor and the board on which the multilayer capacitor is mounted. Accordingly, stress from the board may not be directly transmitted to the multilayer capacitor.

However, in this case, a gap may be formed between the multilayer capacitor and the board due to the bonded metal frame, which may increase ESR of the multilayer capacitor as compared to a structure in which a multilayer capacitor is directly in contact with a board.

In the example embodiment, the mounting portion of the metal frame may be disposed on each of both ends of the capacitor body and in a central portion such that a gap between electrodes may be reduced, and also, even though the metal frame is included, ESR of the multilayer capacitor may be reduced.

ESL may be dependent on a length and the number of a current loop, and the shorter the length of a current loop and the greater the number of a current loop, ESL of a multilayer capacitor may decrease.

Figure 10:
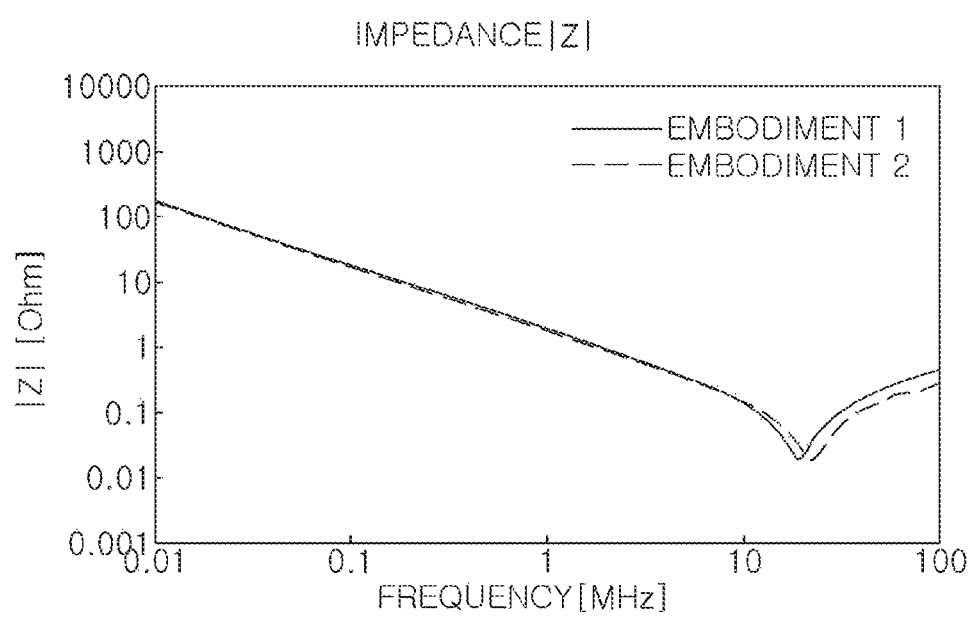
FIG. 10 is graphs illustrating changes in ESR of the electronic components illustrated in FIGS. 5 and 7.

FIG. 10 is a graph illustrating changes in ESL of the electronic components illustrated in FIGS. 5 and 7, embodiment 1 relates to changes in ESL of an electronic component of FIG. 5, and embodiment 2 relates to changes in ESL of an electronic component of FIG. 7.

Referring to FIG. 10, a current loop in the embodiment 2 is shorter than in embodiment 1, and the number of a current loop in the embodiment 2 is greater than that of the embodiment 1. Thus, it may be indicated that ESL is lower in the embodiment 2 than in the embodiment 1.

According to the aforementioned example embodiment, by including a metal frame, durability against vibration and deformation may increase, and ESR of a multilayer capacitor may decrease.

While the exemplary embodiments have been shown and described above, it will be apparent to those skilled in the art that modifications and variations could be made without departing from the scope of the present invention as defined by the appended claims.

What is claimed is:

1. An electronic component, comprising: a capacitor body having first and second surfaces opposing each other, third and fourth surfaces connected to the first and second surfaces and opposing each other, fifth and sixth surfaces connected to the first and second surfaces and to the third and fourth surfaces and opposing each other, and including a plurality of dielectric layers layered in a first direction in which the fifth and sixth surfaces oppose each other and first and second internal electrodes alternately layered with the dielectric layer interposed therebetween; first and second external electrodes disposed on both ends of the capacitor body in a second direction in which the third and fourth surfaces oppose each other, respectively; a third external electrode disposed on the first surface of the capacitor body; and first to third metal frames connected to the first to third external electrodes, respectively, wherein both ends of the first internal electrode are exposed through the third and fourth surfaces of the capacitor body, respectively, wherein the second internal electrode includes a 2-1st lead portion exposed through the first surface of the capacitor body and connected to the third external electrode, and wherein the third metal frame is connected to the third external electrode on the first surface.

2. The electronic component of claim 1, wherein the first metal frame includes a first vertical portion bonded to the first external electrode and extending further than one end of the capacitor body in a third direction in which the first and second surfaces oppose each other, and a first mounting portion extending from one end of the first vertical portion in the second direction, wherein the second metal frame includes a second vertical portion bonded to the second external electrode and extending further than the one end of the capacitor body in the third direction, and a second mounting portion extending from one end of the second vertical portion in the second direction, and wherein the third metal frame includes a third vertical portion bonded to the third external electrode and extending further than the one end of the capacitor body in the third direction from the third vertical portion, and a third mounting portion extending from one end of the third vertical portion in the first direction.

3. The electronic component of claim 1, wherein the third metal frame includes a 3-1st metal frame and a 3-2nd metal frame connected to the third external electrode and spaced apart from each other in the first direction, wherein the 3-1st metal frame includes a 3-1st horizontal portion bonded to the third external electrode, a 3-1st vertical portion extending further than one end of the capacitor body in the third direction from the 3-1st horizontal portion, and a 3-1st mounting portion extending from one end of the 3-1st vertical portion in the first direction, and wherein the 3-2nd metal frame includes a 3-2nd horizontal portion bonded to the third external electrode, a 3-2nd vertical portion extending further than the one end of the capacitor body in the third direction from the 3-2nd horizontal portion, and a 3-2nd mounting portion extending from one end of the 3-2nd vertical portion in the first direction.

4. The electronic component of claim 1, wherein the first external electrode includes a first connection portion disposed on the third surface of the capacitor body and a first band portion extending from the first connection portion to a portion of each of the first, second, fifth, and sixth surfaces of the capacitor body, and wherein the second external electrode includes a second connection portion disposed on the fourth surface of the capacitor body and a second band portion extending from the second connection portion to a portion of each of the first, second, fifth, and sixth surfaces of the capacitor body.

5. The electronic component of claim 1, wherein the third external electrode extends to a portion of each of the fifth and sixth surfaces of the capacitor body.

6. The electronic component of claim 1, wherein the second internal electrode further includes a 2-2nd lead portion exposed through the second surface of the capacitor body, and wherein the electronic component further includes a fourth external electrode disposed on the second surface of the capacitor body and connected to the 2-2nd lead portion.

7. The electronic component of claim 6, wherein the fourth external electrode extends to a portion of each of the fifth and sixth surfaces of the capacitor body.

8. An electronic component, comprising: a capacitor body having first and second surfaces opposing each other, third and fourth surfaces connected to the first and second surfaces and opposing each other, fifth and sixth surfaces connected to the first and second surfaces and to the third and fourth surfaces and opposing each other, and including a plurality of dielectric layers layered in a first direction in which the fifth and sixth surfaces oppose each other and third and fourth internal electrodes alternately layered with the dielectric layer interposed the rebetween; first and second external electrodes disposed on both ends of the capacitor body in a second direction in which the third and fourth surfaces oppose each other, respectively; a fifth external electrode disposed on the first surface of the capacitor body; a plurality of sixth external electrodes disposed on the first surface of the capacitor body and spaced apart from the fifth external electrode; first and second metal frames connected to the first and second external electrodes, respectively; a fifth metal frame connected to the fifth external electrode; and a plurality of sixth metal frames connected to the plurality of sixth external electrodes, respectively, wherein both ends of the third internal electrode are exposed through the third and fourth surfaces of the capacitor body, respectively, and the third internal electrode includes a 3-1st lead portion exposed through the first surface of the capacitor body and connected to the fifth external electrode, wherein the fourth internal electrode includes a plurality of 4-1st lead portions exposed through the first surface of the capacitor body, connected to the plurality of sixth external electrodes, respectively, and spaced apart from each other, and wherein at least one of the fifth metal frame is connected to the fifth external electrode on the first surface or the plurality of sixth metal frames is connected to the plurality of sixth external electrodes, respectively, on the first surface.

9. The electronic component of claim 8,
wherein the first metal frame includes a first vertical portion bonded to the first external electrode and extending further than one end of the capacitor body in a third direction in which the first and second surfaces oppose each other, and a first mounting portion extending from one end of the first vertical portion in the second direction,
wherein the second metal frame includes a second vertical portion bonded to the second external electrode and extending further than the one end of the capacitor body in the third direction, and a second mounting portion extending from one end of the second vertical portion in the second direction,
wherein the fifth metal frame includes a fifth horizontal portion bonded to the fifth external electrode, a fifth vertical portion extending further than the one end of the capacitor body in the third direction from the fifth horizontal portion, and a fifth mounting portion extending from one end of the fifth vertical portion in the first direction, and
wherein the plurality of sixth metal frames include a sixth horizontal portion bonded to the sixth external electrode, a sixth vertical portion extending further than the one end of the capacitor body in the third direction from the sixth horizontal portion, and a sixth mounting portion extending from one end of the sixth vertical portion in the first direction.

10. The electronic component of claim 8,
wherein the fifth metal frame includes a 5-1st metal frame and a 5-2nd metal frame connected to the fifth external electrode and spaced apart from each other in the first direction,
wherein the 5-1st metal frame includes a 5-1st horizontal portion bonded to the fifth external electrode, a 5-1st vertical portion extending further than one end of the capacitor body in the third direction from the 5-1st horizontal portion, and a 5-1st mounting portion extending from one end of the 5-1st vertical portion in the first direction, and
wherein the 5-2nd metal frame includes a 5-2nd horizontal portion bonded to the fifth external electrode, a 5-2nd vertical portion extending further than the one end of the capacitor body in the third direction from the 5-2nd horizontal portion, and a 5-2nd mounting portion extending from one end of the 5-2nd vertical portion in the first direction.

11. The electronic component of claim 8,
wherein the first external electrode includes a first connection portion disposed on the third surface of the capacitor body and a first band portion extending from the first connection portion to a portion of each of the first, second, fifth, and sixth surfaces of the capacitor body, and
wherein the second external electrode includes a second connection portion disposed on the fourth surface of the capacitor body and a second band portion extending from the second connection portion to a portion of each of the first, second, fifth, and sixth surfaces of the capacitor body.

12. The electronic component of claim 8, wherein the fifth and sixth external electrodes extend to a portion of each of the fifth and sixth surfaces of the capacitor body.

13. The electronic component of claim 8,
wherein the third internal electrode further includes a 3-2nd lead portion exposed through the second surface of the capacitor body,
wherein the fourth internal electrode further includes a plurality of 4-2nd lead portions exposed through the second surface of the capacitor body and spaced apart from each other, and
wherein the electronic component further includes a seventh external electrode disposed on the second surface of the capacitor body and connected to the 3-2nd lead portion, and a plurality of eighth external electrodes disposed on the second surface of the capacitor body and spaced apart from the seventh external electrode and connected to the plurality of 4-2nd lead portions, respectively.

14. The electronic component of claim 13, wherein the seventh and eighth external electrodes extend to a portion of each of the fifth and sixth surfaces of the capacitor body.

15. An electronic component, comprising: a capacitor body having first and second surfaces opposing each other, third and fourth surfaces connected to the first and second surfaces and opposing each other, fifth and sixth surfaces connected to the first and second surfaces and to the third and fourth surfaces and opposing each other, and including a plurality of dielectric layers layered in a first direction in which the fifth and sixth surfaces oppose each other and first and second internal electrodes alternately layered with the dielectric layer interposed therebetween, wherein opposing ends of the first internal electrode are exposed through the third and fourth surfaces of the capacitor body, respectively, and the second internal electrode includes a first lead portion exposed through the first surface of the capacitor body; first and second external electrodes disposed on the third and fourth surfaces, respectively, and connected to the opposing ends of the first internal electrode, respectively, a third external electrode disposed on the first surface of the capacitor body, and connected to the first lead portion of the second internal electrode; and first to third metal frames connected to the first to third external electrodes, respectively, and each including a vertical portion extending in a second direction in which the first and second surfaces oppose each other and a mounting portion extending from one end of the vertical portion, wherein each mounting portion is spaced apart from the first to third external electrodes, and wherein the third metal frame is connected to the third external electrode on the first surface.

16. The electronic component of claim 15,
wherein the vertical portion of the first metal frame is bonded to the first external electrode, and the mounting portion of the first metal frame extends from the one end of the vertical portion of the first metal frame in a third direction in which the third and fourth surfaces oppose each other,
wherein the vertical portion of the second metal frame is bonded to the second external electrode, and the mounting portion of the second metal frame extends from the one end of the vertical portion of the second metal frame in the third direction, and
wherein the mounting portion of the third metal frame extends from the one end of the vertical portion of the third metal frame in the first direction.

17. The electronic component of claim 16,
wherein the third metal frame further includes a horizontal portion connected to the third external electrode, and
wherein the vertical portion of the third metal frame connects the horizontal portion and the mounting portion of the third metal frame to each other.

18. The electronic component of claim 15,
wherein the first external electrode includes a first connection portion disposed on the third surface of the capacitor body and a first band portion extending from the first connection portion to a portion of each of the first, second, fifth, and sixth surfaces of the capacitor body, and
wherein the second external electrode includes a second connection portion disposed on the fourth surface of the capacitor body and a second band portion extending from the second connection portion to a portion of each of the first, second, fifth, and sixth surfaces of the capacitor body.

19. The electronic component of claim 15, wherein the third external electrode extends to a portion of each of the fifth and sixth surfaces of the capacitor body.

20. The electronic component of claim 15,
wherein the second internal electrode further includes a second lead portion exposed through the second surface of the capacitor body, and
wherein the electronic component further includes a fourth external electrode disposed on the second surface of the capacitor body and connected to the second lead portion.

* * * * *